United States Patent [19]
Davis et al.

[11] Patent Number: 6,080,506
[45] Date of Patent: Jun. 27, 2000

[54] PRESSURE ACTIVATED CURRENT INTERRUPTER FOR ELECTROCHEMICAL CELLS

[75] Inventors: Stuart M. Davis, Norfolk; Sean Sargeant, Westford; Douglas J. Woodnorth, Needham, all of Mass.

[73] Assignee: Duracell Inc.

[21] Appl. No.: 08/998,537

[22] Filed: Dec. 26, 1997

[51] Int. Cl.[7] .................................................. H01M 10/48
[52] U.S. Cl. .................................................. 429/61; 429/90
[58] Field of Search ........................................ 429/61, 90

[56] References Cited

U.S. PATENT DOCUMENTS

| | | |
|---|---|---|
| 2,651,669 | 9/1953 | Neumann ................................. 136/182 |
| 3,622,397 | 11/1971 | Belove . | |
| 4,035,552 | 7/1977 | Epstein ........................................ 429/7 |
| 4,992,344 | 2/1991 | Coppers ..................................... 429/61 |
| 5,057,382 | 10/1991 | Tucholski . | |
| 5,171,648 | 12/1992 | Beard . | |
| 5,405,712 | 4/1995 | Dawson . | |

*Primary Examiner*—John S. Maples
*Attorney, Agent, or Firm*—Barry D. Josephs; Paul I. Douglas; Thomas G. Krivulka

[57] ABSTRACT

The invention is directed to a pressure activated current interrupt assembly for cells, particularly alkaline cells. The current interrupter is located at the closed end of the cell's housing. The current interrupter assembly comprises an electrically insulating member in proximity to the terminal at the closed end of the housing. The insulating member is in physical communication with a deflectable member formed from the cell's housing. When gas pressure within the cell builds up to exceed a predetermined value, the deflectable member deforms causing the insulating member to protrude beyond the extremity of said cell terminal, thereby preventing electrical contact between said terminal and the terminal of another cell or electrical device.

15 Claims, 4 Drawing Sheets

PRESSURE ACTIVATED CURRENT INTERRUPTER FOR ELECTROCHEMICAL CELLS

FIELD OF THE INVENTION

This invention relates to current interrupters for an electrochemical cell wherein the current interrupter safely prevents cell operation upon an excessive increase in the gas pressure therein.

BACKGROUND OF THE INVENTION

A problem associated with design of various electrochemical cells, particularly alkaline cells, is the tendency of the cell to produce gases as it continues to discharge beyond a certain point, normally around the point of complete exhaustion of the cell's useful capacity. Gas may also be generated when a cell is force discharged as occurs when cells of nominally equal but not absolutely identical capacity are discharged in a series configuration. Gas may also be produced when a cell is charged, particularly if the cell is not specifically designed for use as a rechargeable cell or if an incorrect charger is used. Additives may be included with the anode and cathode or various cell components may be coated to retard such gassing. Nevertheless, electrochemical cells, particularly alkaline cells, are conventionally provided with rupturable diaphragms or membranes within an end cap assembly for the cell's casing. A cell having such rupturable diaphragm is described, for example, in U.S. Pat. No. 3,617,386. Such diaphragms are designed to rupture when gas pressure within the cell exceeds a predetermined level. The end cap assembly may be provided with vent holes for the gas to escape when the diaphragm or membrane is ruptured.

Although such rupturable diaphragms provide the cell with a significant safety feature for releasing gas pressure they do have the disadvantage that corrosive or harmful electrolyte could possibly be carried out the vent passages along with the gas.

Cells can be provided with pressure responsive members within the cell body which rupture or become dislodged causing a break in the electrical pathway within the cell itself, that is, between one of the cell electrodes (anode or cathode) and a corresponding cell terminal (positive or negative terminal). A pressure responsive current interrupt device of this type is described in U.S. Pat. No. 4,035,552. Such pressure responsive current interrupt devices add significantly to the cost of the cell, since they are designed to function while remaining wholly within the cell. They also have the disadvantage of using up a significant amount of space within the cell which could otherwise be used for additional anode or cathode material.

Other types of pressure activated current interrupt devices for cells utilize an external contact ring which electrically connects the cell casing to the peripheral edge of a cell terminal plate at the closed end of the casing. A pressure activated current interrupt device of this type is described in U.S. Pat. No. 4,992,344. The casing in turn is in electrical contact with one of the cell electrodes, typically the cathode in alkaline cells. The body of the terminal is otherwise insulated from the cell casing. When gas pressure builds within the cell the closed end of the casing bulges causing the conductive ring to break its connection with the terminal plate thereby breaking the electrical pathway between electrode and terminal plate to shut down the cell. Although a portion of this type of current interrupt device is external to the cell, the device as a whole has proved to be costly to manufacture and functionally unreliable.

U.S. Pat. No. 2,651,669 describes a cell with a deformable flat diaphragm which is inserted as a separate piece within the open end of the casing for the cell. When pressure builds within the cell the diaphragm is intended to deflect outwardly causing an insulating stud in contact therewith to protrude from a terminal of the cell to break electrical contact with another device. The described design has the disadvantage that the deformable diaphragm must be inserted into the cell casing as a separate piece thereby requiring independent sealing between the diaphragm and the cell casing.

Accordingly, it is desirable to provide the cell with an auxiliary or substitute pressure activated current interrupter device which is readily manufactured, reliable, does not require additional sealing and does not significantly reduce cell capacity. It is desirable to provide a cell with such pressure activated current interrupt device which activates before pressure builds up to a level high enough to cause venting of gas and expulsion of electrolyte from the cell.

SUMMARY OF THE INVENTION

The present invention is directed to a pressure activated current interrupt assembly for electrochemical cells, particularly alkaline cells. The current interrupt assembly of the invention comprises a support base and an electrically insulating member which is movable responsive to movement of the support base. The support base is an integral portion of the cell casing (housing) and has a deflectable surface responsive to gas pressure. The support base with deflectable surface preferably comprises a portion of the closed end of a cylindrical housing for the cell. The insulating member is in physical communication with the deflectable surface of the support base. When gas pressure within the cell builds up to exceed a predetermined level the support base deflects causing the insulating member to protrude from the terminal pip thereby breaking electrical contact between the cell and the contact terminal of another cell, device being powered, or apparatus charging the cell.

When applied to alkaline cells the pressure activated current interrupt assembly of the invention is advantageously located at the closed end of the casing which forms the positive terminal of the cell. Thus, when activated the insulating member protrudes from the positive terminal to break electrical contact between that terminal and a contact terminal of another cell, electrical device being powered, or apparatus charging the cell.

In one aspect the current interrupt assembly may be applied to the closed end of a cylindrical casing for alkaline cells of the type having an integrally formed positive pip at the closed end of the cell's casing. In such cells the positive pip is itself integrally formed from the cell's casing at the closed end of the cell. The inside surface of the positive terminal pip is exposed to gas buildup which may occur within the cell. In accordance with an aspect of the present invention the central portion of such terminal may be concaved inwardly to form a trough exposed to the external environment and an insulating member attached to the external surface of the trough so that it is also exposed to the environment. The trough surface of the terminal forms the support base for the insulating member. During normal cell operation the insulating member while located on the external side of the terminal nevertheless remains submerged below the peripheral edges of the inwardly concaved portion of the terminal pip which forms the trough. When pressure within the cell builds to exceed a predetermined value the concaved portion of the terminal pip bulges outwardly causing the trough to invert, thereby pushing the insulating member into contact with the contact terminal of another cell or electrical device, thereby breaking electrical contact with such other cell or device. The insulating member in such embodiment may be a glob of plastic material which may take the form of an elongated slab or circular or oval disk.

In another aspect the current interrupt assembly may be located at the closed end of alkaline cells of the type lacking an integrally formed positive pip at the flat closed end of the casing. Such cells may be constructed with an outer plate (terminal plate) welded along its peripheral edge to the cell casing surface at the closed end of the cell. The welded outer plate has a central portion which functions as the cell's positive terminal pip. In accordance with an aspect of the present invention the support base for the insulating member may be a portion of the cell casing at the closed end of the cell. The support base may have a deflectable surface which is responsive to gas pressure. The insulating member of the current interrupt assembly of the invention may be inserted between the support base and the outer terminal plate so that a portion of the insulating member is in physical communication with the deflectable surface of the support base. An aperture may be provided at or near the center of the terminal plate. When pressure within the cell builds to exceed a predetermined value said deflectable surface formed from a portion of the cell casing at the closed end of the cell bulges outwardly causing the insulating member to be pushed through the aperture in the terminal plate. As the insulating member pushes through said aperture, the insulating member is forced into contact with the terminal of another cell or device being powered, thereby breaking electrical contact between the cell and device being powered. The insulating member in such embodiment may advantageously be in the form of an elongated plastic member having a bulbous or disk shaped central region.

DETAILED DESCRIPTION

The pressure activated current interrupter assembly of the present invention may be advantageously applied to primary cells, for example alkaline cells, or to rechargeable cells, for example lithium ion, nickel metal hydride or nickel cadmium rechargeable cells. The invention is advantageously applied to the closed end of the housing of such cells.

Figure 1:
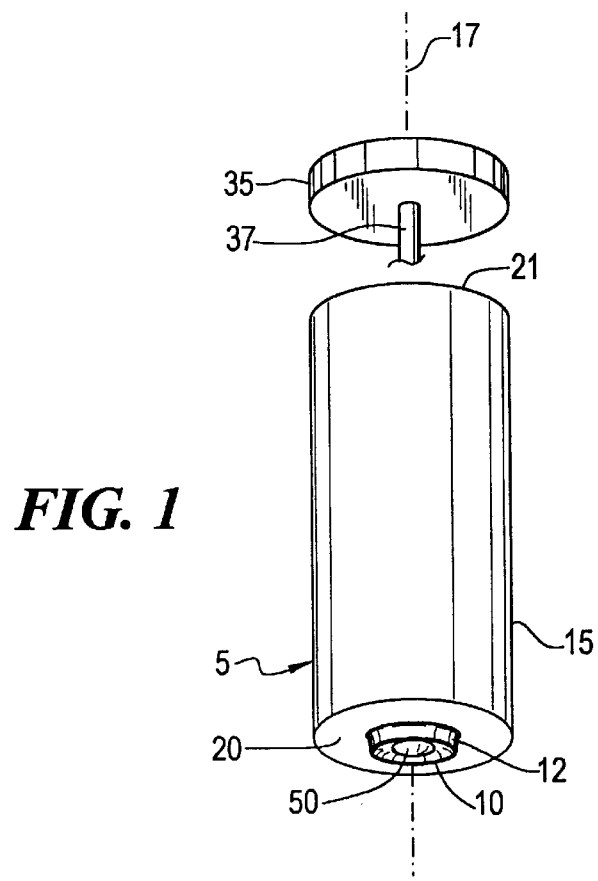
FIG. 1 is a perspective view of the cell casing with current interrupter of the invention at the closed end thereof.

Electrochemical cells, such as cell 5 (FIG. 1) typically have a cylindrical casing (housing) 15 having a closed end formed from the casing itself as shown in FIG. 1. The cell is filled with contents including anode 60 and cathode 40 and electrolyte with separator 85 between anode and cathode. An end cap assembly 35 containing a current collector 37 is then fitted and sealed into the open end 21 of the cell. The present invention is directed to including a pressure responsive current interrupt assembly at the closed end 20 of such casing. The current interrupt assembly 10 (FIG. 2) or 100 (FIG. 3A) or 200 (FIG. 5A) of the invention utilizes the closed end of the casing. The current interrupt assembly embodiments 10, 100 and 200 comprises an integral member formed from a portion of said cell housing, said integral member having a deflectable surface responsive to gas pressure build up within the cell. The deformable member preferably has an inwardly curved surface and lies substantially in a plane which is perpendicular to the longitudinal axis 17 of cell 5. When gas pressure within the cell builds up to exceed a predetermined value the curved surface deflects outwardly causing an insulating member to protrude from an extremity of a terminal of the cell in proximity therewith. The protrusion of the insulating member breaks the electrical contact between the terminal of the cell and the contact terminal of another cell, device to be powered, or apparatus charging the cell.

Many cells particularly alkaline cells are designed to have a chemical balance of active cathode material to active anode material of >1.0 based on assumed electrochemical capacities of 410 milliamp-hr/g of $MnO_2$ and 820 milliamp-hr/g of zinc. That is, the active anode material will discharge leaving excess (undischarged) active cathode material. In alkaline cells the active anode material is zinc and the active cathode material is manganese dioxide. The cell balance (cathode/anode) in alkaline cells is desirably between about 1.05 and 1.15. Operation at the low end of this range, i.e., a cell balance of 1.05 and lower, e.g. between about 0.95 and 1.05 is desirable in that the cell's high power performance may be increased, that is, longer cell life at high drain rates. However, at such low cell balance there is a greater risk of buildup of internal gas pressure, particularly if the cell is subjected to unusual or extreme usage conditions. Examples of such extreme usage conditions may be if the cell was charged but was not specifically designed to be rechargeable or if the cell was first subjected to high power usage, e.g for AA cells, continuous drain at between about 0.5 amp and 2.0 amp and then discharged to completion at low drain (less than 0.1 amp).

The current interrupt assembly of the present invention has the advantage of shutting down the cell without expulsion of gas or corrosive electrolyte before the cell's main venting system employing rupturable diaphragms and the like become activated and therefore result in a safer cell design, particularly for cells having a lower chemical balance (cathode/anode ratio). The current interrupt assembly of the invention also significantly reduces the chance of "cell bulging" resulting from gas pressure buildup, which bulging can cause the cell to become stuck in battery compartments for devices to be powered.

Figure 2:
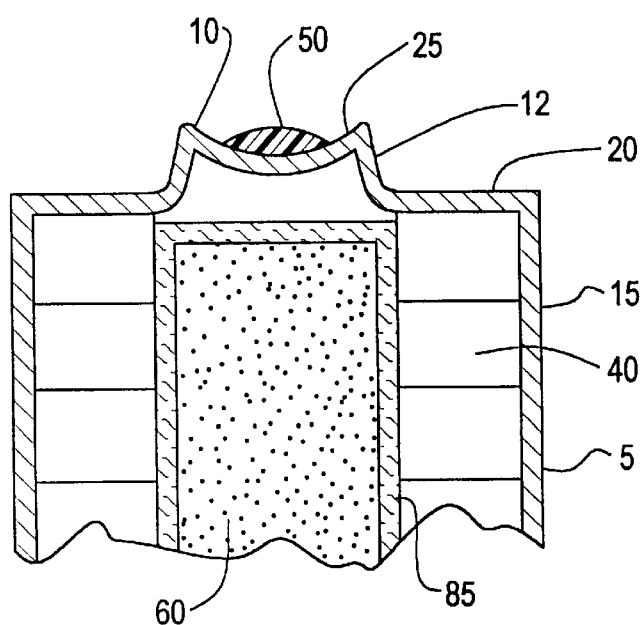
FIG. 2 is a cross sectional view of the closed end of the integrally pipped alkaline cell with an embodiment of the current interrupter assembly of the invention.
Figure 2A:
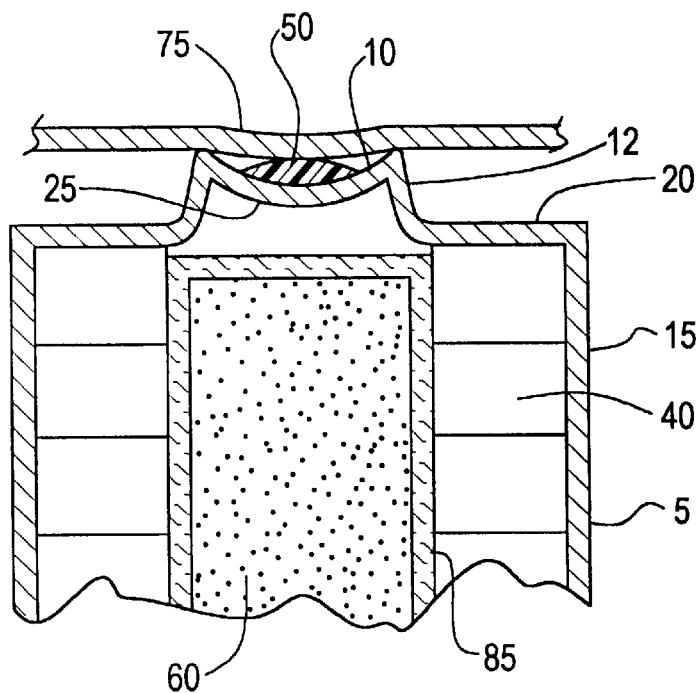
FIG. 2A is a cross sectional view of the closed end of the integrally pipped alkaline cell of FIG. 1 in electrical contact with the terminal of another cell or device to be powered.
Figure 2B:
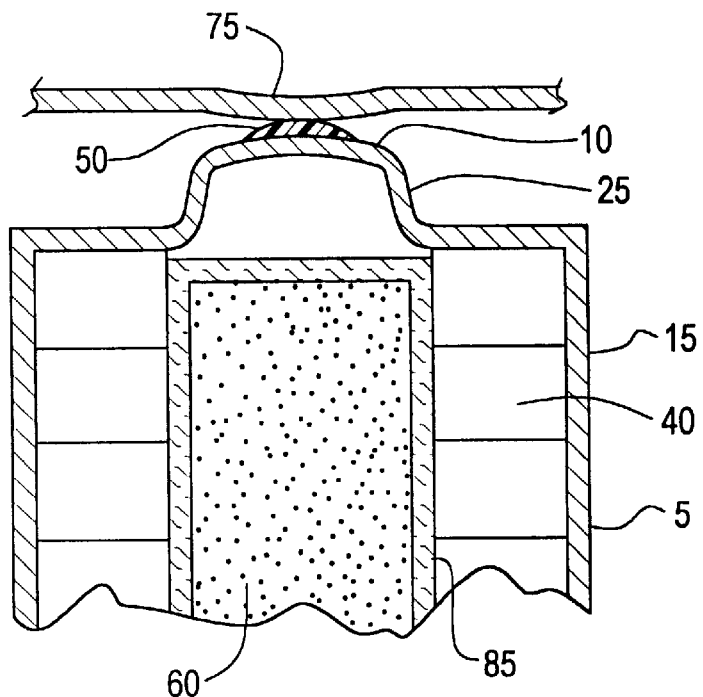
FIG. 2B is a cross sectional view of the closed end of the cell of FIG. 2A after gas pressure within the cell has activated the current interrupter of the invention.

In a preferred embodiment of the invention shown in FIG. 2 the current interrupt assembly 10 is applied to the closed end 20 of a cylindrical casing 15 for integrally pipped alkaline cells, e.g., alkaline cells having the positive terminal pip formed from a portion of the cell's casing at the closed end of the cell as in FIG. 2. The casing of a representative alkaline cell is shown in FIG. 1. Such alkaline cells have a cylindrical casing 15 initially formed with one end closed and the opposite end open. Alkaline cells have an anode comprising zinc, a cathode comprising manganese dioxide, an electrolyte of potassium hydroxide and a separator material, typically comprising rayon or cellulose. After the cell is filled with anode and cathode active material, an end cap assembly 35 is inserted into the open end 21 to seal the cell. The end cap assembly contains a rupturable diaphragm through which gas may escape to the environment if gas pressure within the cell builds up to exceed a predetermined value. A suitable end cap assembly and method of sealing same within the open end of the cell is described in U.S. Pat. No. 4,537,841 herein incorporated by reference. The end cap assembly at the open end contains the negative terminal and the closed end 20 of the casing 15 at the opposite end forms the positive terminal pip 12. The positive terminal pip 12 is formed from a portion of the closed end 20 of the casing 15, referred to herein as an "integrally pipped" casing. Therefore, the inside surface of the positive terminal pip 12 at the closed end 20 is exposed to gas buildup which may occur within the cell as the cell discharges. The central portion of terminal pip 12 may be dished inwardly to form a depressed or trough area 25 exposed to the external environment. An electrically insulating member 50 is attached to and held in place within trough area 25. Thus, trough area 25 of the terminal pip 12 forms a support base for insulating member 50. During normal cell operation (FIG. 2A) terminal pip 12 is in electrical contact with another cell 75 or a terminal of a device being powered, and under normal cell operating conditions insulating member 50 remains submerged below the peripheral edges of the trough area 25. When pressure within the cell builds to exceed a predetermined value trough area 25 bulges outwardly causing the insulating member 50 to protrude from the outer surface of terminal 12 as shown in FIG. 2B, thereby breaking electrical contact with another cell or device being powered. Once the trough area 25 bulges outwardly it remains in this position even if the cell pressure returns to normal levels.

The insulating member 50 in such embodiment may advantageously be in the form of an elongated slab or circular or oval disk of plastic material. Preferably, insulating member 50 is of polyolefin or polyamide (nylon) plastic material and is secured to the surface of concaved portion 25 of terminal pip 12 by hot melt adhesive or may consist of a free standing bead of adhesive such as epoxy or hot melt. The thickness of insulating member 50 may desirably be between about 0.02 and 0.5 mm, preferably between about 0.1 and 0.3 mm. When applied to AA cells the concaved portion 25 of terminal pip 12 may preferably have a radius of curvature of about 8 mm and depth of about 0.25 mm. Terminal pip 12 and concaved portion 25 is preferably of steel. The concaved portion 25 preferably has a thickness of about 0.2 mm. When applied to D cells the concaved portion 25 of terminal pip 12 may preferably have a radius of curvature of about 16 mm and depth of about 0.5 mm. Terminal pip 12 and concaved portion 25 is preferably of steel material. The concaved portion 25 preferably has a thickness of about 0.2 mm.

The current interrupter embodiment of FIG. 2 is advantageously designed to activate when gas pressure within the cell reaches a level (current interrupter activation level) of between about 500 and 2000 psi (34,473,000 and 137,894,000 dynes/cm$^2$) for AA size cells and between about 200 and 800 psi (13,789,000 and 55,158,000 dynes/cm$^2$) for D size cells. When such pressure level is reached the concaved central portion 25 of terminal pip 12 bulges outwardly with a force desirably between about 8000 and 100000 grams-force. This is a force that is about of the order 100 times the typical contact force between a cell and a terminal of a device to be powered or between cells connected in series (cell to cell contact) within a cell compartment for a device to be powered. (Cells are conventionally held in place within a cell compartment by the force exerted thereon by a weak spring in alignment with the cells.) Since the force exerted by central portion 25 as it bulges outwardly (FIG. 1B) is much greater than the cell to cell or cell to device contact force, the insulating member 50 will protrude enough from the terminal pip 12 to break the cell to cell or cell to device electrical contact as shown in FIG. 2B. Preferably, insulating member 50 will protrude about 0.15 mm for AA size cells and about 0.5 mm for D size cells.

Additionally the cell length may be shortened by about 1 mm to assure that insulator 50 will protrude sufficiently to break electrical contact between connected cells or between a cell and the terminal of a device to be powered. It is not believed that such shortening of the cell is needed to accommodate the current interrupter assembly of the invention under normal situations. but such design may be considered to assure the necessary protrusion of insulator member 50 even in special situations where the cell to cell or cell to device contact force is unusually high, for example, if the cell compartment or springs holding the cells in place become corroded or the cell compartment is unusually tightly designed.

Figure 3A:
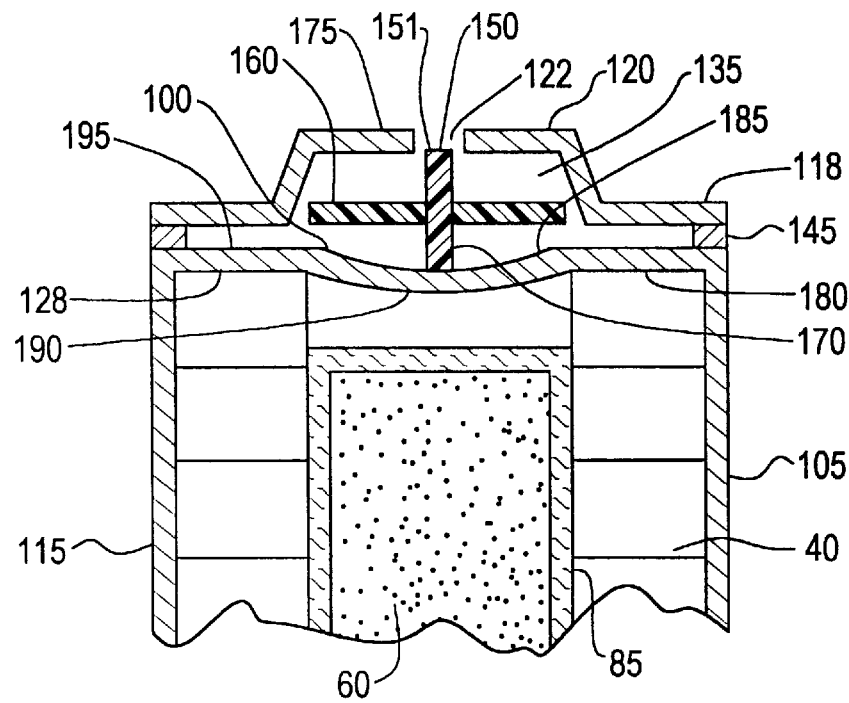
FIG. 3A is a cross sectional view of the closed end of a flat non-integrally pipped (welded positive terminal plate) alkaline cell with another embodiment of the current interrupter assembly of the invention.
Figure 3B:
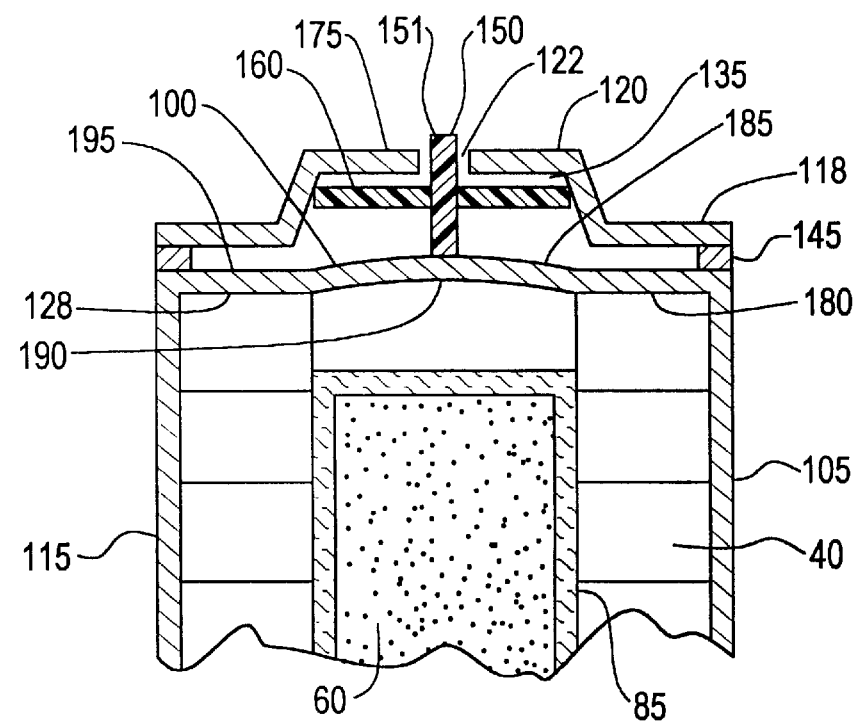
FIG. 3B is a cross sectional view of the closed end of the cell of FIG. 3A after gas pressure within the cell has activated the current interrupter of the invention.
Figure 4:
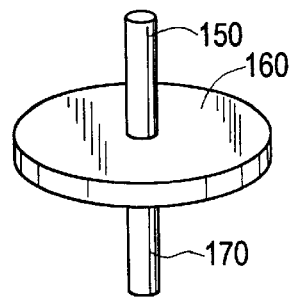
FIG. 4 is a perspective view of a specific embodiment of the current interrupter insulating member.
Figure 5A:
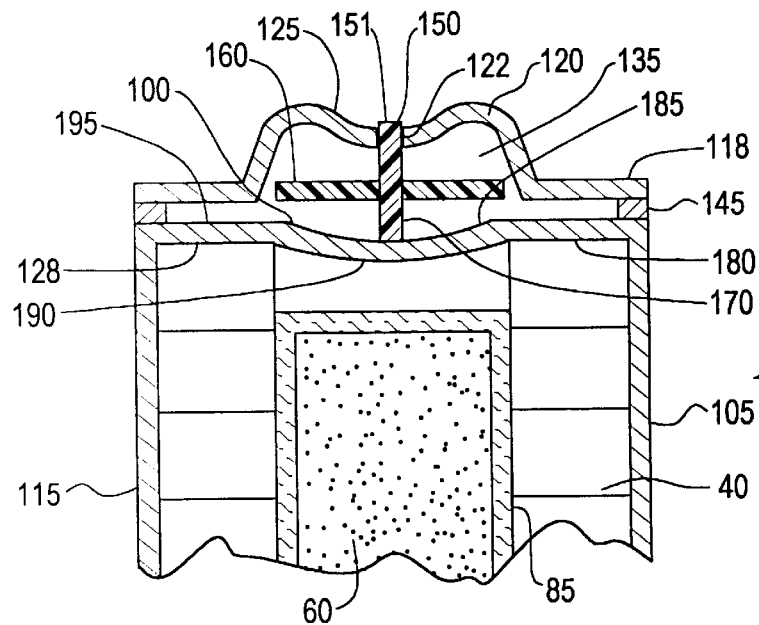
FIG. 5A is a cross sectional view of the closed end of a curved non-integrally pipped (welded positive terminal plate) alkaline cell with another embodiment of the current interrupter assembly of the invention.
Figure 5B:
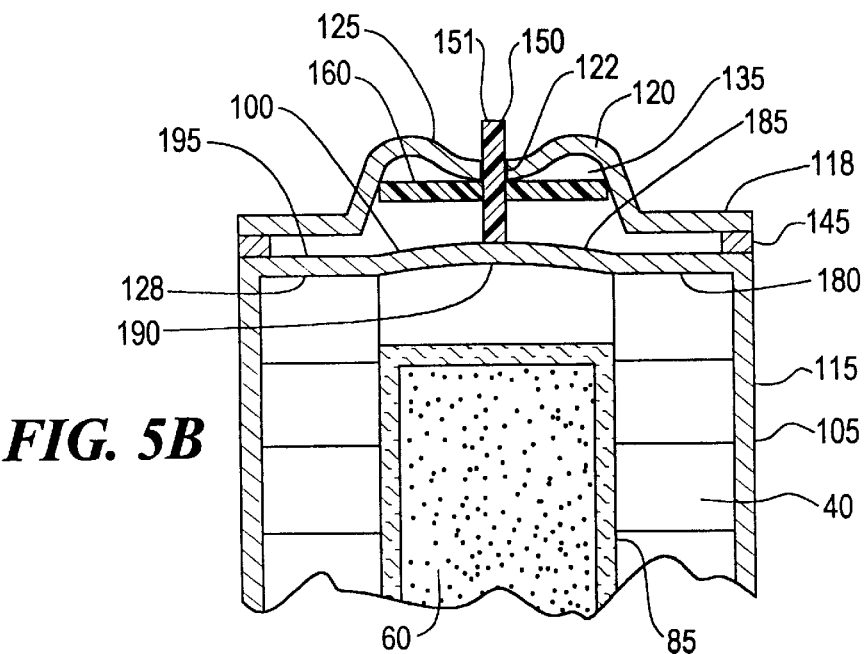
FIG. 5B is a cross sectional view of the closed end of the cell of FIG. 5A after gas pressure within the cell has activated the current interrupter of the invention.

In another preferred embodiment shown in FIG. 3A the current interrupt assembly 100 may be located at the closed end of a cell 105. Current interrupter assembly 100 comprises a deflectable support base 180 forming an integral part of cell casing 115, and an insulating member 150 in physical communication with support base 180. In the embodiment shown in FIG. 3A a terminal plate 120 is welded to the support base. The terminal plate 118 has a pip 120 having a flat surface 175 with an aperture 122 threretrough. In an alternate embodiment shown in FIG. 5A the current interrupt assembly 100 is similar but the terminal plate 118 has a pip 120 having an inwardly curved central surface 125. The cell 105 in these embodiment may advantageously be C or D size alkaline cells. Such cells are formed of a cylindrical casing 115 having a closed end 118 formed by casing 115 and an opposite open end as described above with respect to cell 5 (FIG. 1). An end cap assembly is inserted into the open end as above described after the cell has been filled with anode, cathode separator and electrolyte. The cell may preferably have an outer plate (terminal plate 118) welded to the cell casing 115 at the closed end 118. Terminal plate 118 is welded to casing 115 by applying spot welds 145 between the peripheral edge of terminal plate 118 and the cell casing 115. The central portion of the outer plate (terminal plate 118) forms the positive terminal pip 120. Terminal pip 120 (FIG. 3A) has a flat contact surface 175 having an aperture 122. Alternatively, as shown in FIG. 5A terminal pip 120 may have an inwardly curved central portion 125. The insulating member 150 of the current interrupt assembly of the invention may be inserted between the casing surface 180 at the closed end of the cell and the terminal plate 118. In such embodiment the cell casing surface 180 at the closed end of the cell may function as a support base for insulating member 150. In the embodiment shown in FIG. 3A the head 151 of insulating member 150 rests preferably in a position just below the inside surface of terminal pip 120 under normal cell operating conditions. In this embodiment (FIG. 3A) aperture 122 is larger the diameter of the head 151 of insulating member 150. In the alternative embodiment shown in FIG. 5A the head 151 of insulating member 150 preferably rests within aperture 122 under normal cell operating conditions. The central portion 185 of support base 180 may be concaved inwardly as shown in FIGS. 3A or 5A. The support base 180 comprising concaved portion 185 therefore is an integral portion of casing 115. The concaved support base 180 and terminal pip 120 define a chamber 135 for holding insulating member 150. An aperture 122 is provided at or near the center of terminal pip 120. When pressure within the cell builds to exceed a predetermined value the concaved portion 185 of support base 180 bulges outwardly causing the insulating member 150 to be pushed through the aperture 122 as shown in FIG. 3B or 5B. Once support base 180 bulges outwardly it remains in this position even after the cell pressure returns to normal levels. As insulating member 150 pushes through aperture 122, said insulating member is forced into contact with the terminal of another cell or device being powered, thereby breaking electrical contact with said other cell or device. The insulating member 150 in such embodiment may advantageously be in the form of an elongated member having a bulbous or disk shaped central region 160 to keep it in place between support base 180 and terminal plate 118.

Insulating member 150 may preferably be of polyolefin or polyamide (nylon) plastic material. The length of insulating member 150 may desirably be between about 2 mm and 10 mm, preferably about 4 mm and the diameter of disk portion 160 may be between about 2 mm and 10 mm. The depth of concave central portion 185 of support base 180, that is, from its apex 190 to its annular base 195 is preferably between about 0.5 and 2 mm. The radius of curvature of the concaved portion 185 (FIGS. 3A and 5A) may preferably be between about 5 mm and 20 mm. In the variation shown in FIG. 5A also having an inwardly curved central portion 125 of pip 120, the depth of the concaved central portion 125 may be between about 0.5 mm and 2 mm. Terminal pip 120 may advantageously be of steel material having a thickness of about 0.25 mm. Support base 180 may preferably of steel material having a thickness of about 0.25 mm. When the current interrupt assembly 100 (FIG. 3A or FIG. 5A) is applied to C or D size cells chamber 135 has a length between apex 190 and pip flat surface 175 (FIG. 3A) or between apex 190 and pip inwardly curved central portion 125 (FIG. 5A) of between about 2 mm and 15 mm.

The current interrupter embodiments of FIG. 3A or FIG. 5A is advantageously designed to activate when gas pressure within the cell (cell sizes from AAA to D size) reaches a level (current interrupter activation level) of between about 200 and 2500 psi (13,789,000 and 172,368,000 dynes/cm$^2$). When such pressure level is reached the concaved central portion 185 of support base 180 bulges outwardly with a force desirably between about 8000 and 100000 grams-force. This is a force that is about of the order 100 times the typical contact force a cell and a terminal of a device to be powered or between cells connected in series (cell to cell contact) within a cell compartment for a device to be powered. (Cells are conventionally held in place within a cell compartment by the force exerted thereon by a weak spring in alignment with the cells.) Since the force exerted by central portion 185 as it bulges outwardly (FIG. 3B or FIG. 5B) is much greater than the cell to cell or cell to device contact force, the insulating member 150 will protrude from the terminal pip 120 enough to break the cell to cell or cell to device electrical contact. Preferably, insulating member 150 will protrude from terminal pip 120 by about 0.5 mm.

Although the present pressure activated current interrupter assembly of the invention was described with reference to specific embodiments it should be appreciated that other embodiments and variations of the invention are possible without departing from the concept herein described. Accordingly, the present invention is not intended to be limited to any specific embodiment but rather is defined by the claims and equivalents thereof.

What is claimed is:

1. An electrochemical cell comprising a cylindrical housing having an integral surface forming a closed end and a sealable open end opposite said closed end, a pair of terminals each having a surface extremity for electrical contact, wherein one of said terminals is located at the closed end of the housing, said cell further comprising a current interrupter assembly located at said closed end of the housing, said current interrupter assembly comprising an electrically insulating member in proximity to said terminal at the closed end of the housing and means for causing said insulating member to protrude outwardly from said terminal when gas pressure within the cell builds up to exceed a predetermined value, thereby preventing electrical contact between said terminal and the terminal of another cell or other electrical device, wherein said means for causing said insulating member to protrude outwardly from said terminal comprises an integral member comprising a portion of said integral surface of the housing forming said closed end, said integral member having a deflectable surface responsive to gas pressure build up within the cell, the insulating member being in physical communication with said deflectable surface of said integral member, wherein when gas pressure within the cell builds up to exceed a predetermined value, said surface deflects outwardly causing the insulating member to protrude beyond the extremity of said terminal at the closed end of the housing.

2. The electrochemical cell of claim 1 wherein said deflectable surface lies in a plane substantially perpendicular to the longitudinal axis of said cell, said deflectable surface being curved inwardly towards the cell interior.

3. The electrochemical cell of claim 2 wherein said integral member having said inwardly curved surface also forms the terminal at the closed end of the cell and said inwardly curved surface forms a trough on the external side of said terminal.

4. The electrochemical cell of claim 3 wherein said insulating member is affixed to said curved surface within said trough at the external side of said terminal, said curved surface providing a support base for the insulating member.

5. The electrochemical cell of claim 4 wherein said insulating member comprises a glob of plastic material, wherein when gas pressure within the cell builds up to exceed a predetermined value, said curved surface deflects outwardly causing said trough to invert and said insulating member to protrude from the extremity of said terminal thereby preventing electrical contact between said terminal and another cell or other electrical device.

6. The electrochemical cell of claim 5 wherein said insulating member protrudes at least about 1 mm from the extremity of said terminal when said curved surface deflects outwardly causing said trough to invert.

7. The electrochemical cell of claim 5 wherein said cell is an alkaline cell and said terminal at the closed end of said housing forms the cell's positive terminal.

8. The electrochemical cell of claim 2 wherein said integral member having said inwardly curved surface is formed from a portion of the closed end of said housing.

9. The electrochemical cell of claim 8 wherein said cell further comprises a metallic outer plate welded to said integral member forming the closed end of the housing, said plate having an outwardly protruding central portion forming said terminal at the closed end of the housing.

10. The electrochemical cell of claim 9 wherein the region between said inwardly curved surface at the closed end of the housing and the central portion of said outer plate defines a chamber wherein at least a substantial portion of said insulating member is located within said chamber and a portion of said insulating member is in physical communication with said inwardly curved surface.

11. The electrochemical cell of claim 10 wherein the central portion of said outer plate forming said terminal has an aperture therethrough wherein when gas pressure within the cell builds up to exceed a predetermined value, said curved surface at the closed end of the housing deflects outwardly causing at least a portion of said insulating member to protrude through said aperture and extend beyond the extremity of said terminal at the closed end of the housing, thereby preventing electrical contact between said terminal and another cell or device to be powered.

12. The electrochemical cell of claim 11 wherein said insulating member is an elongated member having a bulbous or disk shaped midsection to stabilize said insulating member within said chamber.

13. The electrochemical cell of claim 11 wherein the portion of said plate immediately surrounding said aperture is curved inwardly towards the interior of the cell and a portion of said insulating member protrudes through said aperture but does not extend beyond the extremity of said terminal at the closed end of the housing until gas pressure within the cell builds up to exceed a predetermined value.

14. The electrochemical cell of claim 11 wherein said cell is an alkaline cell and said terminal at the closed end of said housing forms the cell's positive terminal.

15. An electrochemical primary alkaline cell comprising a cylindrical housing having an integral surface forming a closed end, and a sealable open end opposite said closed end, a pair of terminals, each having a surface extremity for electrical contact, wherein one of said terminals is located at the closed end of the housing, said cell further comprising a current interrupter assembly located at said closed end of the housing, said current interrupter assembly comprising an electrically insulating member in proximity to said terminal at the closed end of the housing and means for causing said insulating member to protrude outwardly from said terminal when gas pressure within the cell builds up to exceed a predetermined value, wherein said means for causing said insulating member to protrude from said terminal comprises an integral member comprising a portion of said integral surface of the housing forming said closed end, said integral member having a deflectable surface responsive to gas pressure build up within the cell, the insulating member being in physical communication with said deflectable surface, wherein when gas pressure within the cell builds up to exceed a predetermined value, said surface deflects outwardly causing the insulating member to protrude beyond the extremity of said terminal at the closed end of the housing, thereby preventing electrical contact between said terminal and another cell or electrical device.

* * * * *